US011459066B2

(12) United States Patent
Sims et al.

(10) Patent No.: US 11,459,066 B2
(45) Date of Patent: Oct. 4, 2022

(54) LAGOON SYSTEM AND METHOD FOR MOORING A NET PEN

(71) Applicant: Forever Oceans Corporation, Warrenton, VA (US)

(72) Inventors: Neil Anthony Sims, Kailua-Kona, HI (US); Jason Heckathorn, Nokesville, VA (US); Gavin Key, Kailua-Kona, HI (US)

(73) Assignee: Forever Oceans Corporation, Bethesda, MD (US)

( * ) Notice: Subject to any disclaimer, the term of this patent is extended or adjusted under 35 U.S.C. 154(b) by 0 days.

(21) Appl. No.: 17/007,346

(22) Filed: Aug. 31, 2020

(65) Prior Publication Data
US 2021/0114693 A1    Apr. 22, 2021

Related U.S. Application Data

(63) Continuation of application No. 15/513,003, filed as application No. PCT/US2015/051386 on Sep. 22, 2015, now Pat. No. 10,766,576.

(60) Provisional application No. 62/053,473, filed on Sep. 22, 2014.

(51) Int. Cl.
*B63B 21/50* (2006.01)
*A01K 61/65* (2017.01)

(52) U.S. Cl.
CPC .............. *B63B 21/50* (2013.01); *A01K 61/65* (2017.01); *Y02A 40/81* (2018.01)

(58) Field of Classification Search
CPC ........ B63B 21/50; A01K 61/10; A01K 61/55; A01K 61/60; A01K 61/65; A01K 61/70; A01K 61/75; A01K 61/78; Y02A 40/81; Y02A 40/828

USPC .......................................... 119/215, 221, 223
See application file for complete search history.

(56) References Cited

U.S. PATENT DOCUMENTS

| | | |
|---|---|---|
| 3,628,333 A | 12/1971 | Newton |
| 3,691,994 A | 9/1972 | McPherson |
| 4,084,543 A | 4/1978 | Pequegnat |
| 4,257,350 A | 3/1981 | Streichenberger |
| D271,096 S | 10/1983 | Nurmi |
| 4,716,854 A | 1/1988 | Bourdon |
| 4,957,064 A | 9/1990 | Koma |
| 5,172,649 A | 12/1992 | Bourgeois |
| 5,299,530 A | 4/1994 | Mukadam et al. |
| 5,359,962 A | 11/1994 | Loverich |
| 5,438,958 A | 8/1995 | Ericsson et al. |
| 5,617,813 A | 4/1997 | Loverich et al. |

(Continued)

FOREIGN PATENT DOCUMENTS

| | | |
|---|---|---|
| CN | 101014492 A | 8/2007 |
| CN | 101133724 A | 3/2008 |

(Continued)

OTHER PUBLICATIONS

International Search Report and Written Opinion dated Dec. 8, 2015, issued in International Application No. PCT/US2015/051386.

*Primary Examiner* — Brady W Frazier
(74) *Attorney, Agent, or Firm* — Rimon Law, P.C.

(57) ABSTRACT

Mooring systems and methods are provided. One system may include at least one object partially or fully submerged in a body of water. The system may also include a semi-rigid outer ring that is adrift or moored to at least one sea anchor or to the sea floor by at least one mooring line. At least one object may be connected or tethered by bridle lines to the semi-rigid outer ring to form an array.

18 Claims, 3 Drawing Sheets

(56) References Cited

U.S. PATENT DOCUMENTS

| | | | |
|---|---|---|---|
| 5,762,024 | A | 6/1998 | Meilahn |
| 5,797,348 | A | 8/1998 | Taherzadeh |
| 6,170,424 | B1 | 1/2001 | Boerseth |
| 6,481,378 | B1 | 11/2002 | Zemach |
| 7,743,733 | B2 | 6/2010 | Harrison et al. |
| 8,037,838 | B2 | 10/2011 | Oigarden et al. |
| 2004/0123809 | A1 | 7/2004 | Klein |
| 2006/0130728 | A1 | 6/2006 | Zeichner et al. |
| 2009/0107385 | A1 | 4/2009 | Olgarden et al. |

FOREIGN PATENT DOCUMENTS

| | | |
|---|---|---|
| CN | 201140778 Y | 10/2008 |
| WO | WO-2006063412 A1 | 6/2006 |

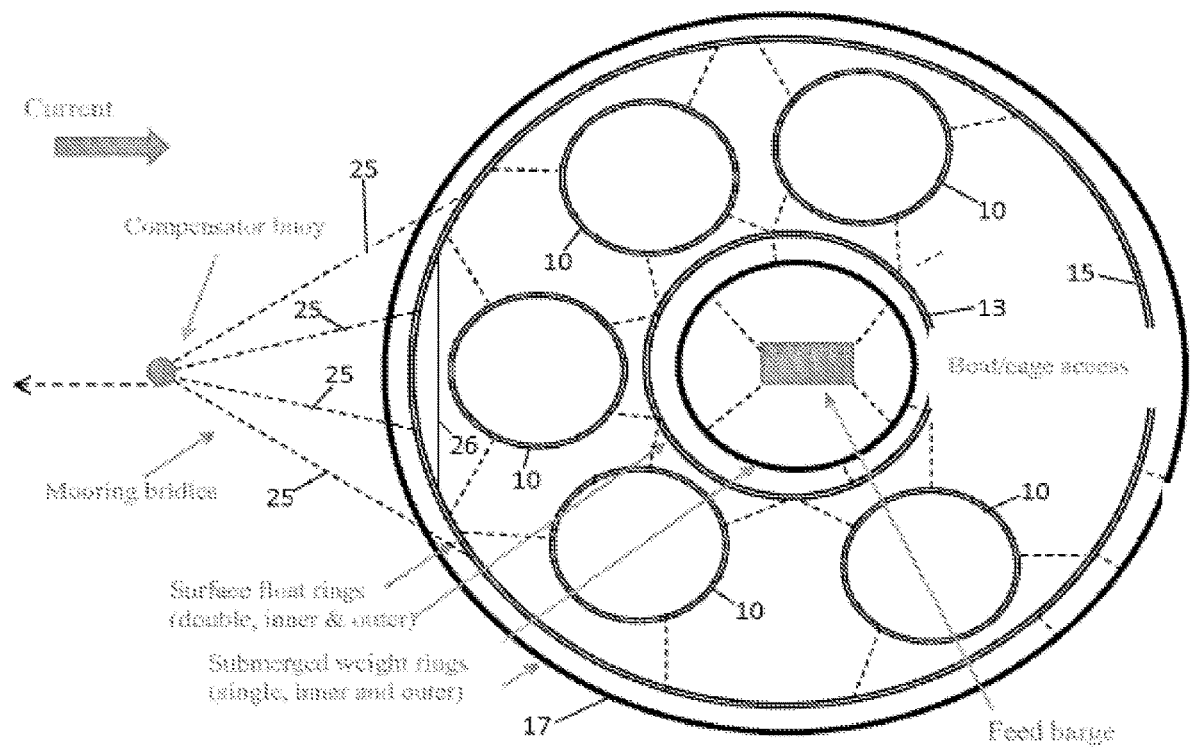
Fig. 4a  Plan View
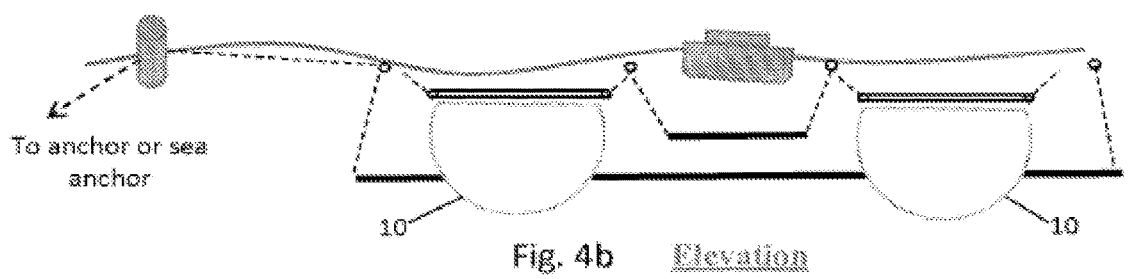
Fig. 4b  Elevation

LAGOON SYSTEM AND METHOD FOR MOORING A NET PEN

CROSS-REFERENCE TO RELATED APPLICATIONS

This application is a continuation of U.S. patent application Ser. No. 15/513,003, filed Mar. 21, 2017, which is a U.S. national phase entry (371) of International Patent Application No. PCT/US2015/051386, filed Sep. 22, 2015, which claims priority to U.S. provisional application No. 62/053,473, filed on Sep. 22, 2014, the entire contents of each of which are hereby incorporated by reference.

FIELD

Embodiments generally relate to systems and/or methods for bridling and/or tethering objects or vessels in bodies or water.

BACKGROUND

Ocean aquaculture requires significant infrastructure, such as pens to contain fish and barges to perform husbandry functions. Other activities in the ocean or other bodies or water—such as habitation, research platforms or military purposes—also require infrastructure that is held on a mooring in a robust, semi-rigid fashion. This infrastructure is generally secured using taut-line mooring systems. A multi-point taut-line mooring system is usually used to secure infrastructure. Multi-point taut-line mooring systems offer the advantage of being able to hold infrastructure in a fixed location, with each moored element a fixed distance apart. The fixed relationship of space between infrastructure assets prevents collisions and tangling, and allows scaling of the infrastructure within a limited geographic proximity. The tension of the mooring lines holds the objects or vessels in place, relative to each other. Grid-lines may allow multiple objects or vessels to be held in close proximity. The fixed residual buoyancy points of a multi-point taut-line mooring system also allow for submergence of any object to a pre-determined depth, depending on the length of the bridle lines from the object to the residual buoyancy point. However, multi-point taut-line mooring systems are highly complex, expensive, often infeasible for securing infrastructure in deep waters, and do not allow the array to orient along a single axis into the current.

Single-point mooring systems have been used to secure infrastructure in deeper waters. Single-point mooring systems in use up to this point, however, do not hold infrastructure in a fixed location, as the floating infrastructure will change positon according to wind and currents, within an umbra or "watch circle" as dictated by the length of the mooring rode, and conventionally could not allow for ready submergence of objects, without risk of collision, entanglement or other problematic interaction. Slack-line moorings and unmoored objects also present similar risks of collision and entanglement, and do not allow objects to be readily submerged at a set depth separate from the residual buoyancy. Thus, multiple infrastructure assets each on a single point or slack-line mooring, or adrift unmoored in a limited geographical proximity have a risk of colliding with each other, or of tangling the bridle lines. Such collisions or entanglements can destroy infrastructure and are normally avoided by not allowing multiple objects on single-point or slack-line moorings, or on unmoored arrays.

Thus the inability of single and multi-point slack-line mooring systems and unmoored arrays to accommodate cost effective deployment of scalable offshore infrastructure is a significant drawback.

SUMMARY

One embodiment is directed to a mooring system. The system may include at least one object partially or fully submerged in a body of water. The system may also include a semi-rigid outer ring that is adrift or moored to at least one sea anchor or to the sea floor by at least one mooring line. The at least one object may be connected or tethered by bridle lines to the semi-rigid outer ring to form an array.

In an embodiment, the array is unanchored, tethered to a sea anchor, or moored on either a SPM or multiple slack-line moorings. In certain embodiments, at least one object may be enclosed or contained within the semi-rigid outer ring. According to one embodiment, at least one object may comprise net pens used to retain fish. In another embodiment, the at least one object may comprise vessels bridled together inside the semi-rigid outer ring.

In certain embodiments, the system may also include spoke lines extending from one side of the semi-rigid outer ring to another side of the semi-rigid outer ring. In one embodiment, the spoke lines may include semi-taut lines for culture of marine life, such as bivalves and/or macroalgae.

Another embodiment may include a mooring method. The method may include partially or fully submerging at least one object in a body of water. The method may also include placing a semi-rigid outer ring such that it is adrift or moored to at least one sea anchor or to the sea floor by at least one mooring line. The method may further include connecting or tethering the at least one object by bridle lines to the semi-rigid outer ring.

Another embodiment is directed to a system that may include submerging means for partially or fully submerging at least one object in a body of water. The system may also include containing means for containing the at least one object. The containing means may be adrift or moored to at least one sea anchor or to a floor of the body of water by at least one mooring line. The system may also include connecting means for connecting or tethering the at least one object by bridle lines to the semi-rigid outer ring.

BRIEF DESCRIPTION OF THE DRAWINGS

For proper understanding of the invention, reference should be made to the accompanying drawings, wherein:

FIG. 4a illustrates a plan view of a multiple pen single-point mooring array, according to an embodiment;

FIG. 4b illustrates an elevation view of a multiple pen single-point mooring array, according to an embodiment.

DETAILED DESCRIPTION

It will be readily understood that the components of the invention, as generally described and illustrated in the figures herein, may be arranged and designed in a wide variety of different configurations. Thus, the following detailed description of the embodiments of a bridling or mooring system and method, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different configurations and functions discussed below may be performed in a different order and/or concurrently with each other. Furthermore, if desired, one or more of the described configurations or functions may be optional or may be combined. As such, the following description should be considered as merely illustrative of the principles, teachings and embodiments of this invention, and not in limitation thereof.

Certain embodiments relate to bridling, mooring, and/or tethering systems for objects or vessels in oceans, lakes, or other bodies or water. For example, some embodiments are directed to bridling and tethering systems to secure aquaculture pens or other infrastructure in the ocean, relative to each other and the current, independent of taut-line moorings.

One embodiment includes an integrated array that may use a single-point mooring (SPM), slack-line mooring or unmoored system to fix multiple objects into position in an array, such that they are oriented along one axis relative to the current, and/or such that they allow the multiple objects to be oriented and spaced apart, relative to each other. For instance, some embodiments allow for multiple net pens (either submergible or surface pens) to be deployed in a SPM, slack-line mooring or unanchored array, such that they are in place relative to each other, for example to prevent collision or tangling, and held within close proximity to a feed barge. The SPM or unanchored array may also be oriented into the current with a defined fore and aft.

Figure 1:
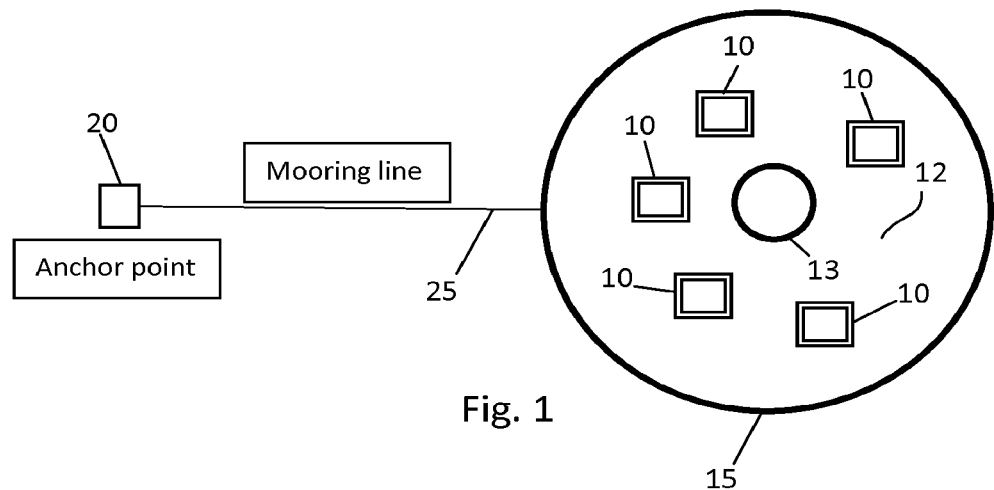
FIG. 1 illustrates a plan view of a lagoon array on a single point mooring system, according to one embodiment.

FIG. 1 illustrates one embodiment of a lagoon array on a single point mooring system which allows each object to be oriented towards the current and/or towards each other, and to be held apart from each other to prevent collisions or tangling. In this embodiment, as illustrated in FIG. 1, multiple objects 10 may be bridled inside the lagoon 12, and held in position by bridle lines 15 to the outer ring (e.g., atoll). In one example, the outer ring 15 may be made of high-density polyethylene (HDPE), for example. However, other materials may be used for the outer ring 15 according to some other embodiments. The objects 10 are held in place relative to each other, and relative to the current. According to an example embodiment, the outer ring 15 may be anchored to an anchor point 20 by mooring line 25. In other embodiments, such as in an unmoored or drifting array, the anchor point 20 and mooring line 25 may be omitted, or may be tethered to a sea anchor or parachute anchor, or similar unfixed object that orients the array.

Figure 2:
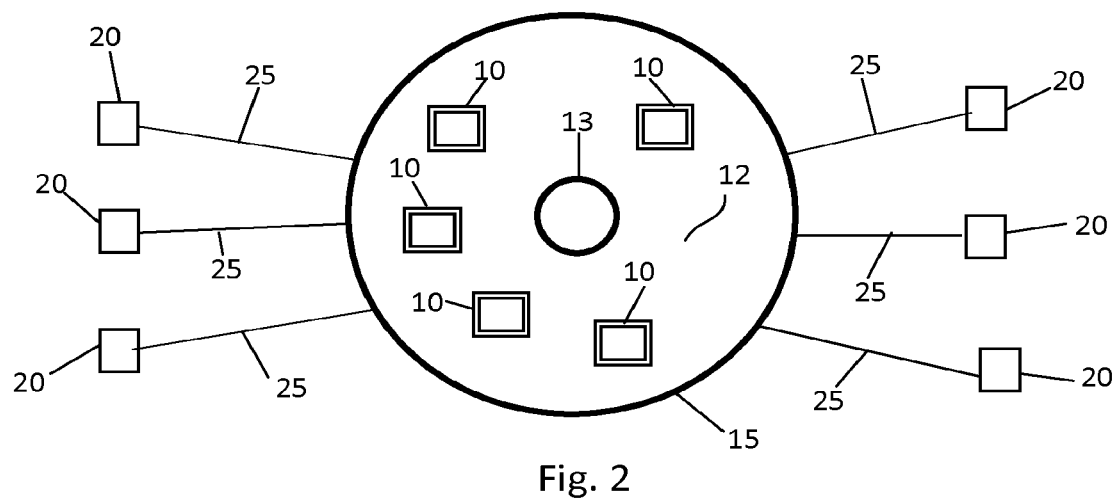
FIG. 2 illustrates a plan view of a lagoon array on a multiple-point slack-line mooring system, according to an embodiment.

FIG. 2 illustrates an embodiment of a lagoon array 12 on a multiple-point slack-line mooring system such as may be used in very deep water. The example lagoon array illustrated in FIG. 2 may allow each object 10 to be held in position relative to the others, and to be held an approximate distance apart from each other object to prevent collisions or tangling. According to this example embodiment, the outer ring 15 may be anchored to a plurality of anchor points 20 by a plurality of mooring line 25.

Figure 3:
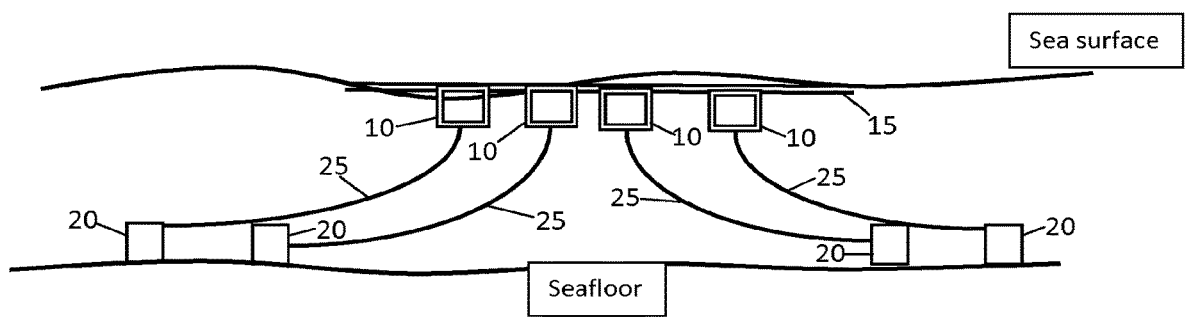
FIG. 3 illustrates an elevation view of a lagoon array on a multiple-point slack-line mooring system, according to an embodiment.

FIG. 3 illustrates another embodiment of a lagoon array 12 on a multiple-point slack-line mooring system such as may be used in very deep water, which allows each object 10 to be held in position relative to the others, and to be held an approximate distance apart from each other object 10 to prevent collisions or tangling. As illustrated in the example of FIG. 3, the outer ring 15 may be anchored to a plurality of anchor points 20 positioned on the seafloor by a plurality of mooring line 25.

Thus, in the examples illustrated in FIGS. 1-3, in example embodiments, a semi-rigid ring or multiple rings, or arcs, or multiple arcs, either floating or submerged, may encompass a number of smaller objects 10, such as vessels, net pens, barges, or other platforms, which are bridled to the outer ring 15 in such a manner as to prevent any of them moving independently of each other, or of the ring.

The ring 15 may be either unmoored and adrift, or may be moored either by a SPM line (moored to a fixed anchor 20 or a drifting sea anchor), which orients the entire array in one direction relative to the current, or by multiple slack-line moorings, which hold the array in place in the approximate center of the moorings. The precise position of the array when moored by multiple slack-line moorings may depend on the degree of scope (i.e., the line length relative to the water depth) and the placement of each of the moorings.

In one embodiment, the semi-rigid ring 15 may be made of HDPE pipe, or pipes, that may be bracketed together or lashed or bridled loosely together, but in such a manner that the combined strength of the rings is greater than the individual ring strength.

In another embodiment, tension spoke-lines 26 may be run across the lagoon, from one side of the ring 15 to the other, to maintain the shape of the semi-rigid ring.

In yet another embodiment, a central "islet" structure 13, such as a barge, smaller HDPE ring, or other platform may act as a connection point for the spoke lines. This barge may be a feed barge or other aquaculture barge, wave or wind energy production barge, or an OTEC, oceanographic, or military facility, for example.

In yet another embodiment, the central "islet" structure 13, such as a barge, may be contained within another series of semi-rigid rings, of similar or different materials and dimensions to the outer ring. These "islet rings" may also be floating or submerged, and may be bracketed or lashed or bridled together as for the outer rings. The spoke lines from the outer ring(s) may connect to some or all of the islet ring(s). In this embodiment, the barge may be connected to the islet rings by bridle lines.

In another embodiment, as illustrated in FIGS. 4a and 4b, floating or submergible net pens 10 are the objects that are held in position inside the lagoon. If submerged net pens are used, the buoyancy of one or more of the rings may be used to keep the submerged net pens at the required depth.

In another embodiment, as illustrated in the example of FIG. 4a, one or more of the rings of the buoyant outer ring 15, or the islet ring 13, is not completely closed into a full circle, allowing for an opening in the ring for the passage into or out of the lagoon by vessels, barges, or other craft. In this embodiment, the buoyant outer ring(s) 15 may be moored or lashed to one or more submerged rings 17 which are completely closed into a circle which provides the required tension to hold the buoyant outer ring(s) 15 in place.

In view of the above as described in connection with FIGS. 1-4, embodiments of the invention provide a mechanism for tethering multiple objects together on a body of water, in either an unmoored drifting array, or on a single-point mooring or slack-line mooring, such that the objects do not rely on tension from any mooring lines to prevent them from colliding, tangling, or otherwise interacting with each other. Instead, the tension to maintain the objects in their set position and orientation relative to each other, and to the current (possibly) is provided by bridle lines to a semi-rigid outer ring or arc, which is itself either adrift, or moored to one or more sea anchors, or moored to the seafloor by one or more mooring lines and anchors.

Embodiments can include any array on a body of water wherein multiple objects are enclosed within a semi-rigid ring or arc that keeps the objects apart, and which may keep them oriented on the same axis into the current. Embodiments include any array of multiple objects in water within an outer semi-rigid ring or arc.

For example, one embodiment may include any array of net pens or other objects that are used to retain fish for culture that are bridled in close proximity to each other inside a semi-rigid ring, with the array either unanchored or tethered to a sea anchor, or moored on either a single point mooring or multiple slack-line moorings.

Another embodiment may include any array of barges or other vessels that are bridled together inside a semi-rigid ring or arc, with the array either unanchored or tethered to a sea anchor, or moored on either a single point mooring or multiple slack-line moorings. It should be included that embodiments may also include any array comprising a combination of net pens and barges or vessels that are bridled to each other inside a semi-rigid ring, with the array either unanchored or tethered to a sea anchor, or moored on either a single point mooring or multiple slack-line moorings.

In addition, certain embodiments include any array where the spoke lines from one side to the other of the outer rings are themselves the objects to be used, such as semi-taut lines for culture of bivalves or macroalgae.

Further, an embodiment includes any array where a semi-rigid ring or arc is positioned in the water column at or near the surface, to dampen wave energy to better enable objects or vessels to be manipulated, moored or stored on the inside of the ring or arc.

One embodiment is directed to a mooring system. The system may include at least one object partially or fully submerged in a body of water. The system may also include a semi-rigid outer ring that is adrift or moored to at least one sea anchor or to the sea floor by at least one mooring line. The at least one object may be connected or tethered by bridle lines to the semi-rigid outer ring to form an array.

In an embodiment, the array is unanchored, tethered to a sea anchor, or moored on either a SPM or multiple slack-line moorings. In certain embodiments, at least one object may be enclosed or contained within the semi-rigid outer ring. According to one embodiment, at least one object may comprise net pens used to retain fish. In another embodiment, the at least one object may comprise vessels bridled together inside the semi-rigid outer ring.

In certain embodiments, the system may also include spoke lines extending from one side of the semi-rigid outer ring to another side of the semi-rigid outer ring. In one embodiment, the spoke lines may include semi-taut lines for culture of marine life, such as bivalves and/or macroalgae.

Another embodiment may include a mooring method. The method may include partially or fully submerging at least one object in a body of water. The method may also include placing a semi-rigid outer ring such that it is adrift or moored to at least one sea anchor or to the sea floor by at least one mooring line. The method may further include connecting or tethering the at least one object by bridle lines to the semi-rigid outer ring.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A mooring system for a net pen, the system comprising:
    a buoyant outer ring connected to an anchor point by at least one mooring line;
    a submerged ring suspended from the buoyant outer ring;
    an islet ring contained within the buoyant outer ring; and
    at least one net pen connected to the buoyant outer ring and the islet ring using a plurality of bridle lines,
    wherein each of the bridle lines has a first end connected to the at least one net pen and a second end connected to the buoyant outer ring or the islet ring.

2. The mooring system of claim 1, wherein the buoyant outer ring comprises a plurality of rings bracketed, lashed, or bridled together.

3. The mooring system of claim 1, wherein the anchor point comprises a single point mooring.

4. The mooring system of claim 1, wherein the anchor point is disposed on a sea floor.

5. The mooring system of claim 1, wherein the at least one mooring line comprises a plurality of mooring lines, and wherein each mooring line from the plurality of mooring lines is attached to a different circumferential location on the buoyant outer ring.

6. The mooring system of claim 1, wherein the islet inner ring comprises a plurality of rings bracketed, lashed, or bridled together.

7. The mooring system of claim 1, wherein the submerged ring provides tension to hold the buoyant outer ring in place.

8. The mooring system of claim 1, wherein a buoyancy of one or more of the buoyant outer ring, the submerged ring, or the islet ring keeps the net pen at a required depth.

9. The mooring system of claim 1, further comprising spoke lines extending from one side of the buoyant outer ring to another side of the buoyant outer ring.

10. A mooring method for a net pen, the method comprising:
    connecting a buoyant outer ring to an anchor point using at least one mooring line;
    suspending a submerged ring from the buoyant outer ring;
    containing an islet ring within the buoyant outer ring; and
    connecting at least one net pen to the buoyant outer ring and the islet ring using a plurality of bridle lines,
    wherein each of the bridle lines has a first end connected to the at least one net pen and a second end connected to the buoyant outer ring or the islet ring.

11. The method of claim 10, wherein the buoyant outer ring comprises a plurality of rings bracketed, lashed, or bridled together.

12. The method of claim 10, wherein the anchor point comprises a single point mooring.

13. The method of claim 10, wherein the anchor point is disposed on a sea floor.

14. The method of claim 10, wherein the at least one mooring line comprises a plurality of mooring lines, and wherein each mooring line from the plurality of mooring lines is attached to a different circumferential location on the buoyant outer ring.

15. The method of claim 10, wherein the islet ring comprises a plurality of rings bracketed, lashed, or bridled together.

16. The method of claim 10, wherein the submerged ring provides tension to hold the buoyant outer ring in place.

17. The method of claim 10, wherein a buoyancy of one or more of the buoyant outer ring, the submerged ring, or the islet ring keeps the net pen at a required depth.

18. The method of claim 10, further comprising extending spoke lines from one side of the buoyant outer ring to another side of the buoyant outer ring.

* * * * *